United States Patent Office 2,900,257
Patented Aug. 18, 1959

2,900,257

PREPARATION OF SWISS CHEESE

Zola D. Roundy, Clarendon Hills, Ill., assignor to Armour and Company, Chicago, Ill., a corporation of Illinois No Drawing. Application July 9, 1952
Serial No. 297,983

4 Claims. (Cl. 99—116)

This invention relates to the preparation of Swiss cheese. More particularly, this invention relates to a method of preparing Swiss cheese characterized by a preliminary treatment of the milk to specifically condition it for the manufacture of the cheese.

The Swiss or Emmenthaler type of cheese is characterized by a distinctive nutty flavor, and by the presence of holes or eyes in the body of the cheese. Not only the attainment of the desired nutty flavor, but also the attainment of the proper size, shape, and distribution of the eyes are important from a commercial standpoint. The quality of Swiss cheese is judged largely by the size and shape of the eyes, and by its approach to the characteristic flavor of Swiss cheese. The generally accepted standard is that the eyes should be one-half inch or more in diameter and evenly distributed throughout the body of the cheese. Swiss cheese with small eyes, as well as off-flavor cheese, is placed in one of the lower grades and must therefore be sold at a substantially lower price.

The art of making Emmenthaler cheese is an ancient one, originating in Switzerland, from whence the common name "Swiss cheese" was derived. The steps generally employed in making Swiss cheese may be set out as follows.

(1) Cow's milk is inoculated with a starter culture of a type known to bring about the desired bacteriological changes in the milk.

(2) The milk is set or coagulated, usually with rennet, at a temperature between 85 to 95° F.

(3) The curd is cut.

(4) The cut curd is stirred in the whey while heating, usually at a temperature between about 120 to 138° F.

(5) The curd is separated from the whey.

(6) The curd is pressed to eliminate more whey and to knit or consolidate the curd.

(7) The pressed curd is soaked in brine, usually for about 1 to 4 days at 50 to 60° F.

(8) The salted curd body is drained and stored in a cool room for a short time, for example, for 4 to 15 days at 50 to 60° F.

(9) The cheese is cured in a warm room for several weeks, ordinarily for 2 to 6 weeks at 65 to 80° F.

The steps outlined above for producing Swiss cheese result in the production of the common type of Swiss cheese having a rather heavy rind thereon. Rindless Swiss cheese can also be made by varying the later steps of the above process. For example, the pressed, salted curd can be enclosed in a flexible wrapper and cured therein so as to prevent a formation of the rind. Other variations in the process can also be made.

The physical, chemical, and bacteriological changes occurring during the manufacturing of Swiss cheese are not well understood, although considerable empirical knowledge has accumulated over the years. It has been generally believed that satisfactory Swiss cheese can only be produced from milk of superior bacteriological quality, that is, milk which has a very low bacterial population at the time of delivery to the cheese plant. For example, satisfactory Swiss cheese can generally not be made from raw milk containing a bacterial population of the order of 4 million or more organisms per milliliter. When it is considered that raw milk in certain localities of the Southern and Southwestern States will ordinarily contain from 50 to 100 million or higher organisms per milliliter of milk, it can readily be understood why the commercial manufacturing of Swiss cheese has heretofore been confined to the Northern States, and especially to the far Northern States such as Wisconsin. Even in States such as Wisconsin, the bacteriological suitability of the raw milk is an unknown factor which cannot be entirely controlled. At certain times in the year, operating difficulties are experienced, such as off-flavor, early gas development, and excessive gas development. Too early gas development generally results in poor eye formation, while excessive gas development frequently causes "blowing up" of the cheese.

In making other types of cheese, such as Cheddar cheese, the bacteriological quality of the milk is not so critical. In the making of Cheddar cheese, it is common practice to use a starter culture containing lactic acid-producing organisms such as *Streptococcus lactis*. The lactic acid organisms in the starter culture tend to retard the growth of harmful indigenous organisms in the milk, and thus control the bacteriological action. However, the inclusion of lactic acid-producing organisms in the starting cultures of Swiss cheese has not proven to be an answer to the specific difficulties encountered in making Swiss cheese, such as early gas formation, etc. Furthermore, pasteurized milk cannot be used successfully, according to published reports, and the experimental work leading to the present invention confirms this. On the other hand, pasteurized milk can be used very successfully for manufacturing most types of cheese, and in fact it is regularly used for the manufacture of Cheddar cheese. The reasons for the unsuitability of pasteurized milk for manufacturing Swiss cheese are not clear. It has been suggested that pasteurization destroys some of the indigenous enzymes which are important in the making of the cheese. It is also thought that the heat treatment at pasteurization temperatures brings about an alteration in the character of the protein so as to make it less suitable for making Swiss cheese. A further and probably the most important reason for the failure to produce Swiss cheese from pasteurized milk was discovered during the experimental work leading to the present invention. This reason is that while pasteurization does reduce the total bacterial count of the milk to a low level, in doing so it brings about a drastic alteration in the relative distribution of the organisms. There is considerable evidence to support the view that the selective killing action of pasteurization frequently effects an alteration in the relative abundance of the various types of bacteria in the milk which is unfavorable to the production of high quality Swiss cheese.

It is therefore a general object of this invention to provide an improvement in the art of making cheese of the Swiss type by means of which the quality of the cheese can be controlled in spite of wide variations in the natural bacterial flora of raw milk, both as to the total bacterial population and the relative distribution of the different types of bacteria. More specifically, it is an object of this invention to provide an improved process for manufacturing Swiss cheese by means of which satisfactory Swiss cheese can be prepared from milk of the bacteriological quality which is regularly available in certain areas of the Southern States. It is a further object of this invention to provide a method of conditioning raw, unpasteurized milk to make it particularly suitable for the production of high-grade Swiss cheese by the usually employed process, or variations thereof. Further objects and advantages will become apparent as the specification proceeds.

This invention is based in part on the discovery that high-grade Swiss cheese can be produced with lesser dependence of the bacteriological quality of the raw milk by first treating the milk with hydrogen peroxide, and thereafter using the hydrogen peroxide-treated milk to prepare the cheese. A number of other specific discoveries relating to the technique of treating the milk with the hydrogen peroxide have been made, and these discoveries will subsequently be discussed in detail. One of these discoveries relates to the use of the combination of hydrogen peroxide treatment and a simultaneous heat treatment of lesser severity than that required for pasteurization.

Generally, the process of this invention involves treating raw, unpasteurized cow's milk with a concentrated aqueous solution of hydrogen peroxide. After the milk is substantially free of residual hydrogen peroxide, it is then inoculated with Swiss cheese starter cultures, and the preparation of the cheese is completed in the usual manner. Hydrogen peroxide decomposes into oxygen and water, and therefore does not contaminate the milk. It is believed that the two primary functions of the hydrogen peroxide treatment are to destroy bacteria in the milk and to condition the milk proteins to make them more susceptible to the making of Swiss cheese.

The required concentration of the hydrogen peroxide in the milk to accomplish the purposes of this invention can be varied somewhat. For example, concentrations of the order of .01 to .3% hydrogen peroxide by weight in the milk can be employed. However, it is preferred to employ concentrations of between about .02 to .1% by weight of hydrogen peroxide in the milk, and optimum results are obtained when the concentration employed is between about .04 to .08%. As indicated above, the hydrogen peroxide is preferably added to the milk in a concentrated aqueous solution. The concentration of the aqueous solution of hydrogen peroxide can be varied considerably, but in general commercial grades of hydrogen peroxide having a concentration of between about 20 to 40% by weight of hydrogen peroxide as satisfactory. For example, good results are obtained by using Perone, which is a 35% by weight commercial grade of hydrogen peroxide manufactured by the Du Pont Company of Wilmington, Delaware.

The hydrogen peroxide treatment can be carried out in the cold or at room temperature, although this has been found to be less desirable. Preferably, the milk is maintained at a temperature at least above 100° F. during the hydrogen peroxide treatment. The maximum temperature which should be employed can best be stated by relating it to the temperatures required to effect pasteurization for the same time of treatment. In general, the maximum temperature employed for the combined heat treatment and hydrogen peroxide treatment of the milk should be at least 10° F. below the effective pasteurizing temperature under the same conditions. The temperatures required for the pasteurization of milk to be used as a beverage are considered to be from about 143 to 150° F. when the heating is continued for at least thirty minutes. Higher temperatures can be employed in flash pasteurization procedures. The pasteurizing temperatures for cheese manufacture, such as for those used in the manufacturing of Cheddar cheese, are about the same. The lowest temperature recommended as effective is about 143° F. for thirty minutes. Equivalent pasteurization can be obtained by flash heating the milk at about 160° F. for from 15 to 20 seconds. In the present process, either sustained heating or flash heating can be employed. However, it is important that the heat treatment be much less severe than that required for pasteurization. In general, milk should be heated during the hydrogen peroxide treatment to temperatures between about 120 to 140° F. for at least 30 seconds. Flash heating at temperatures between about 140 to 150° F. with heating periods up to 30 seconds can be employed. However, even in flash heating, it has been found desirable to keep the temperature below 140° F. The optimum temperature is believed to lie between about 120 to 135° F. In this range, the heating can be continued for from 30 seconds to 30 minutes with good results.

It has been discovered that the sequence of steps in the hydrogen peroxide and heat treatment of the milk is of importance. Raw milk contains catalase in substantial but variable quantities. This indigenous catalase brings about the decomposition of the hydrogen peroxide, and thus alters its effective concentration in the milk. It has been discovered that the interfering effect of the indigenous catalase can be considerably lessened by first heating the milk to a temperature above about 120° F. before adding the hydrogen peroxide. However, temperatures above 135° F. are not required. The destruction of hydrogen peroxide by catalase is a somewhat slower process than the destruction of catalase by heat at temperatures above 120° F. Therefore, simultaneous heating and addition of the hydrogen peroxide is a fairly effective procedure. However, it is preferred to maintain the temperature of the milk between about 125 to 135° F. during the hydrogen peroxide treatment.

The result of the preliminary treatment of the milk described above is that the total bacterial population of the milk is reduced to a very low level without the production of an undesirable distribution between the various types of bacteria which would interfere with the production of Swiss cheese. More specifically, the combined heat and hydrogen peroxide treatment under the conditions set forth above are found to kill substantially all of the organisms which are responsible for the defects due to early and excessive gas formation, such as the coliform, and anerobic spore-forming organisms. Also, the treatment of this invention destroys substantially all certain organisms responsible for the production of off-flavors in the cheese, such as the butyric acid organisms, etc. The treated milk is then inoculated with the desired type or types of organisms to bring about the desired bacteriological changes in the milk. It is believed that the Propionibacterium organisms are active in the ripening of Swiss cheese both in producing the characteristic nutty flavor of Swiss cheese, and also in the formation of the eyes in the cheese. Eye formation is believed to be due mainly to the production of carbon dioxide by the Propionibacterium organisms, while the desired flavor is produced by the liberation of organic compounds by the bacteria, such as propionic and acetic acids as well as traces of glycerol and succinic acid.

Both the production and the diffusion of gas (carbon dioxide) are important in producing cheese with the desired size, shape, and distribution of eyes. The cheese body must be of a specific character to cooperate with the gas produced by the bacteria. In other words, the elastic character of the cheese body must be such as to permit it to expand during the evolution of the gas, while at the same time retaining the gas in relatively large pockets or eyes within the cheese body. It has been discovered that the body characteristics of Swiss cheese are considerably improved by treating milk with hydrogen peroxide prior to using it for making the cheese. The preliminary treatment with hydrogen peroxide has been found to render the protein more elastic and thereby more capable of retaining the gas that is produced during the early stages of cheese ripening, while at the same time expanding as the gas is evolved.

A further advantage of preparing Swiss cheese by the process of this invention is that the cheese ripens faster, and when ripened has a finer flavor than cheese produced by ordinary methods. Also, as already brought out, Swiss cheese of satisfactory quality can be made by the process of this invention from milk of poor bacteriological characteristics.

Before using the hydrogen peroxide-treated milk in the making of Swiss cheese, it is desirable to have the milk substantially free of residual hydrogen peroxide. Hydrogen peroxide decomposes on standing, and therefore if sufficient time is allowed after the treatment, the milk will be sufficiently free of hydrogen peroxide. However, it is preferred to induce the rapid decomposition of the residual hydrogen peroxide by adding catalase to the treated milk. In general, a sufficient amount of catalase should be added to completely decompose the hydrogen peroxide. However, the addition of excess catalase is not harmful. Ripened Swiss cheese is known to contain considerable quantities of catalase, and therefore it is possible that a slight excess of catalase, above that required to decompose the residual hydrogen peroxide, is desirable. At any rate, the amount of catalase to be added can be easily gauged by a simple potassium iodide test. When a sample of the milk is added to an aqueous solution of potassium iodide, the presence of hydrogen peroxide will manifest itself by producing a yellow or brown color. When the yellow or brown color is no longer produced in the test solution, sufficient catalase is indicated. If desired, the catalase can be added to the milk immediately after the heat treatment, but preferably the milk is first cooled to prevent the destruction of the catalase by heat. Cooling of the milk to below 110° F., and preferably to below 100° F., is desirable for this reason. The addition of the catalase to the cooled milk rapidly decomposes the hydrogen peroxide and results in a violent foaming, which effects a further purification of the milk by removing dissolved gases, etc.

The treated milk can then be charged to the usual type of cheese vat, and inoculated with a Swiss cheese starter culture of the usual type. For example, a starter culture can be used containing *Lactobacillius bulgaricus, Streptococcus thermophilus,* and *Propionibacterium shermanii.* Widely varying amounts of the starting cultures can be employed in accordance with usual practices.

Following the inoculation of the treated milk in the cheese vat with the starter culture or cultures, the cheese is then prepared in the usual way. For example, cheese can be prepared by the sequence of steps previously set out, or by variations of this procedure. The details of specific procedures are well set out in the following examples. Since the steps required are well known, it is not believed that it will be necessary to further discuss them at this point.

*Example I*

The ordinary type of Swiss cheese having a rind thereon can be produced by the following steps, which involve the distinctive steps of the present invention. These steps are:

(1) Standardize the milk so that the cheese will contain 45% fat in the dry matter.
(2) Clarify the milk at 90° F.
(3) Place 400 pounds of milk in vat.
(4) Heat to 127° F.
(5) Add 327 grams (0.18% of weight of milk) hydrogen peroxide solution (29–35% $H_2O_2$) diluted to 5 times its weight in cold water.
(6) Stir well and hold 15 to 30 minutes.
(7) Cool milk to 96° F.
(8) Add 1.6 g. of catalase (0.5% of the weight of the hydrogen peroxide added) ground in an acetate buffer solution at pH 7.2, diluted to 40 times its weight in cold water.
(9) After the foaming subsides and $H_2O_2$ disappears, add starter (70 cc. *S. thermophilus* and 70 cc. *L. bulgaricus*).
(10) Add rennet, 18 cc. diluted to 500 cc. in cold water.
(11) Cut curd, when ready, to the usual size for Swiss.
(12) Stir 20 to 30 minutes, then heat slowly to 100° F.
(13) Let stand 5 to 10 minutes, draw off about 10% whey, then stir, and heat to 127° F. in 35 minutes.
(14) Stir until curd is ready for dipping, usually from 45 to 60 minutes after turning off the steam.
(15) Dip into hoops and turn hoops at proper intervals to drain the whey and smooth the surface of the cheese.
(16) Salt by placing the cheese in saturated sodium chloride brine at 50° to 60° F. for two days.
(17) Place cheese in cold room (temperature 55° to 60° F.) for 10 days to two weeks, and rub with salt water 2 or 3 times per week to prevent mold growth and to develop a satisfactory rind.
(18) Place cheese in warm room (temperature 70° to 80° F.) to ripen, usually from 3 to 5 weeks.
(19) When eyes have developed, place cheese in a cold room (temperature 35° to 45° F.) for further aging.

*Example II*

Rindless Swiss cheese was prepared by a modification of the method set out in Example I according to the following procedure.

The milk was treated with 0.2% of 35% $H_2O_2$ diluted with an equal weight of water. The $H_2O_2$ was added by means of a flowmeter.

After the hydrogen peroxide had been added, the milk was passed through a flash plate pasteurizer which was held at a temperature of 130° F. for 40 seconds. Following the heat treatment, the milk was clarified by passing it through a cream separator equipped with a special clarifier bowl. The clarification temperature was approximately 80° F. The milk was then standardized by removing cream, so that the solids content of the resulting cheese would test 45 to 46 percent fat. This was accomplished by adjusting the composition of the milk so that it would have a casein to fat ratio of 1:0.85. However, cheese of good quality can be made without removing fat.

The cheese was made in a rectangular, stainless steel vat, having a capacity of 10,000 pounds of milk. To provide adequate agitation, the vat was equipped with two power stirrers instead of the one commonly used in the manufacture of Cheddar cheese. When the vat was about one-third full, the enzyme catalase was added to destroy the hydrogen peroxide. 0.3 g. of 3ONL Catalase per 1000 pounds of milk was ample. By the time the vat was full, most of the hydrogen peroxide had been decomposed.

When the milk in the vat was free of hydrogen peroxide as determined by the potassium iodide test, the starters were added. The following amounts per 1000 pounds of milk gave good results: *Streptococcus thermophilus,* 1000 mls.; *Lactobacillus bulgaricus,* 400 mls.; and *Propionibacterium shermanii,* 500 mls. When the milk was ready to set the temperature was adjusted to 96° F., the milk being stirred meanwhile, and the stirring was continued 10 to 15 minutes. Rennet was then added in sufficient quantity to set the milk in 30 to 35 minutes. Three ounces of rennet diluted in 20 times its weight of cold water, per 1000 pounds of milk, gave good results.

The curd was cut first with ¼" knives, then with a Swiss cheese harp. After cutting, the curd particles should be the size of a kernel of wheat or slightly larger. As soon as the curd was cut, the power stirrers were attached and the stirring was continued.

The contents of the vat were agitated 15 to 20 minutes without heat; then the vat was heated, and the temperature raised to 124° F. which took approximately 35 minutes. During this time the contents of the vat were stirred vigorously with power stirrers. When the desired temperature was reached, the vat was held at that temperature, and the stirring was continued until the curd was cooked, which was usually between 10 and 20 minutes. The time to drain the whey was determined by observing the time required for the loose curd particles to sink to the bottom of a 7% (by weight) salt solution. When they sank to the bottom of a beaker containing 7% salt within 15 to 30 seconds, the whey was drained.

At this time, the stirring of the curd was stopped and the stirrers removed. A curd retainer was then placed in the middle of the vat, and the curd was allowed to settle on the bottom of the vat on both sides of the curd retainer. The area of the vat bottom to be covered by the curd was determined by the quantity of milk used. It was desired that the curd along each side of the bottom of the vat be 14 inches wide and 4¾" deep after the whey was drained, so that the final blocks would be of suitable thickness for the height of the 20-pound Wilson hoop. While the curd was held along the sides of the vat by the curd retainer, the whey was removed by the vat strainer. The whey was drained as quickly as possible. After the removal of the whey a pressure plate was placed on the curd and sufficient pressure was applied to it to cause the curd to fuse. The duration of such pressing was usually 20 to 40 minutes. During this time the whey drained from the curd. The above procedure resulted in the formation of a solid curd without mechanical openings.

Next, blocks of cheese were cut so that each block, without adding or taking curd from it, exactly filled a 20-pound Wilson hoop. The block of curd was wrapped in unbleached muslin, especially cut for this purpose, before it was placed in the hoop.

The hoops containing the cheese were placed in an ordinary horizontal press overnight. Pressure was applied lightly and gradually at first, not more than 8 to 10 pounds (gauge pressure) for the first 15 to 20 minutes. The cheese was then "dressed," after which 14 pounds' pressure (gauge pressure) was applied for 1 hour. Then full pressure (19 to 20 pounds' gauge pressure) was applied for approximately 16 hours. The pH at the end of pressing should be about 5.1; the temperature 100° F.

In the morning, the loaves of cheese were removed from the press and transferred to the brine tank which contained a saturated solution of ordinary sodium chloride. The temperature of the brine was held between 50° and 55° F.

The loaves of cheese were allowed to remain in the brine tank 2 days, as a rule, and were turned two or three times daily. They were taken from the brine tank and the press cloths were removed. At this point, the loaves of cheese were divided into halves, i.e. 5½ x 14 x 3½ inches, or smaller. After the blocks or loaves were cut into the sizes desired, they were wrapped with Parakote or other suitable material, and placed in rigid wooden boxes. Pressure plates were inserted and the loaves were held under pressure for from 1 to 3 weeks at 45° to 55° F. The pressure plates were removed and the loaves of cheese transferred to the ripening room where they ripened without pressure at a temperature of 72° to 75° F. After the eyes formed, the loaves of cheese were transferred to the cold room (35° to 55°) for further aging, or to be held until they were sold.

For shipping, the loaves of cheese were packed in fiber boxes, two 10-pound loaves to a box. The boxes were rigidly bound with a metal binding.

While in the foregoing specification several embodiments of the present invention have been set forth in considerable detail for purpose of illustration, it will be apparent to those skilled in the art that many of the details set forth can be varied widely without departing from the spirit of the invention.

I claim:

1. In the preparation of cheese of the Swiss type, the method of controlling eye formation, characterized by the steps of treating raw, unpasteurized cow's milk with hydrogen peroxide, subsequently inoculating the hydrogen peroxide-treated milk with a Swiss cheese starter culture, and thereafter completing the preparation of said cheese.

2. In the preparation of cheese of the Swiss type, the method of controlling eye formation, characterized by the steps of treating cow's milk with an excess of hydrogen peroxide, decomposing the residual hydrogen peroxide in the milk, then without further treatment of the milk, inoculating it with a Swiss cheese starter culture, and thereafter completing the preparation of said cheese.

3. In the preparation of cheese of the Swiss type, the method of controlling eye formation and accelerating the ripening of the cheese, comprising heating raw unpasteurized cow's milk to a temperature between about 120 to 140° F. while contacting said milk with hydrogen peroxide at a concentration in said milk of between about .04 to .08% by weight, decomposing the residual hydrogen peroxide in the milk, subsequently inoculating the treated milk with a Swiss cheese starter culture, and thereafter completing the preparation of said cheese.

4. In the preparation of cheese of the Swiss type, the method of controlling eye formation and accelerating the ripening of the cheese, comprising heating raw unpasteurized cow's milk to a temperature between about 120° F. but not substantially over 135° F., then adding a sufficient amount of a 20 to 40% by weight aqueous solution of hydrogen peroxide to said milk to produce a hydrogen peroxide concentration therein of between about 0.04 to 0.08% by weight, continuing to heat said milk at a temperature between about 125 to 135° F., cooling said milk to a temperature below about 100° F., adding a sufficient amount of catalase to the cooled milk to decompose substantially all of the residual hydrogen peroxide therein, subsequently inoculating the milk with a Swiss cheese starter culture, and thereafter completing the preparation of said cheese.

References Cited in the file of this patent

UNITED STATES PATENTS

| | | |
|---|---|---|
| 2,482,724 | Baker | Sept. 20, 1949 |
| 2,596,753 | Winger | May 13, 1952 |

OTHER REFERENCES

Heineman: Milk, W. B. Saunders Co., 1919, p. 614.

U.S. Dept. of Agriculture Bulletin No. 608, revised February 1932, pp. 16 to 18.